(12) United States Patent (10) Patent No.: US 11,231,583 B2
Christmas et al. (45) Date of Patent: Jan. 25, 2022

(54) DISPLAY DEVICE AND SYSTEM

(71) Applicant: Envisics Ltd., Milton Keynes (GB)

(72) Inventors: Jamieson Christmas, Milton Keynes (GB); Alexander Cole, Milton Keynes (GB); Mate Karner, Milton Keynes (GB)

(73) Assignee: ENVISICS LTD., Milton Keynes (GB)

( * ) Notice: Subject to any disclaimer, the term of this patent is extended or adjusted under 35 U.S.C. 154(b) by 388 days.

(21) Appl. No.: 16/051,962

(22) Filed: Aug. 1, 2018

(65) Prior Publication Data

US 2019/0041641 A1 Feb. 7, 2019

(30) Foreign Application Priority Data

Aug. 2, 2017 (GB) ...................... 1712435
Aug. 2, 2017 (GB) ...................... 1712436

(51) Int. Cl.
*G03H 1/14* (2006.01)
*G02B 27/01* (2006.01)
(Continued)

(52) U.S. Cl.
CPC ........... *G02B 27/0103* (2013.01); *G02B 5/26* (2013.01); *G02B 27/01* (2013.01); *G02B 27/102* (2013.01);
(Continued)

(58) Field of Classification Search
CPC .. G02B 27/0103; G02B 27/01; G02B 27/102; G02B 27/145; G02B 27/283; G02B 27/288; G02B 27/017; G02B 27/0172–0178; G02B 27/0101–0103; G02B 27/014; G02B 27/0138; G02B 27/148; G02B 5/26; G02B 5/30; G02B 5/3025; G02B 5/32; G02B 2027/015; G02B 2027/0107; G02B 2027/0118;
(Continued)

(56) References Cited

U.S. PATENT DOCUMENTS 7,690,799 B2 4/2010 Nestorovic et al.
8,294,993 B2 10/2012 Niesten
(Continued)

FOREIGN PATENT DOCUMENTS

EP 0710866 A1 5/1996
EP 3 118 667 A1 1/2017
(Continued)

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

A head-up display for a vehicle, the head-up display including a picture generating unit arranged to generate a picture on a light receiving surface; and an optical system arranged to image the picture, where the optical system includes an input arranged to receive light of the picture; an output arranged to output light forming an image of the picture; a first mirror and second mirror arranged to guide light from the input to the output along an optical path, where the optical path includes a first optical path from the input to the second mirror including a transmission through the first mirror; and second optical path from the second mirror to the output including a reflection off the first mirror.

17 Claims, 15 Drawing Sheets

(51) Int. Cl.
*G02B 27/10* (2006.01)
*G02B 5/26* (2006.01)
*G02B 27/14* (2006.01)
*G03H 1/22* (2006.01)

(52) U.S. Cl.
CPC ......... *G02B 27/145* (2013.01); *G03H 1/2294* (2013.01); *G02B 2027/015* (2013.01); *G02B 2027/0107* (2013.01); *G02B 2027/0118* (2013.01); *G03H 2223/17* (2013.01); *G03H 2223/24* (2013.01)

(58) Field of Classification Search
CPC ........... G02B 2027/0174–0178; G02B 6/0031; G02B 6/0026; G02B 6/0055; G02B 6/105; G02B 2006/12116; G03H 2223/24; G03H 2223/17; G03H 1/2294; G03H 1/0005; G03H 1/2202; G03H 1/2205; G03H 2001/2234; G03H 2222/31; G03H 2223/50; G06T 19/006; H04N 13/332
USPC .......................................................... 359/14
See application file for complete search history.

(56) References Cited

U.S. PATENT DOCUMENTS

| | | | |
|---|---|---|---|
| 2013/0265622 A1* | 10/2013 | Christmas | G02B 27/0103 359/9 |
| 2014/0022526 A1 | 1/2014 | Van Eijk et al. | |
| 2014/0253987 A1 | 9/2014 | Christmas | |
| 2015/0098029 A1 | 4/2015 | Sato et al. | |
| 2017/0082855 A1 | 3/2017 | Christmas et al. | |
| 2017/0115627 A1 | 4/2017 | Christmas et al. | |
| 2017/0363869 A1 | 12/2017 | Christmas et al. | |
| 2018/0046138 A1 | 2/2018 | Christmas et al. | |
| 2018/0120768 A1 | 5/2018 | Christmas | |
| 2018/0188532 A1 | 7/2018 | Christmas et al. | |
| 2019/0041641 A1 | 2/2019 | Christmas et al. | |
| 2019/0064738 A1 | 2/2019 | Cole et al. | |

FOREIGN PATENT DOCUMENTS

| | | | | |
|---|---|---|---|---|
| GB | 2482066 A | | 1/2012 | |
| GB | 2496108 A | | 5/2013 | |
| GB | 2526275 A | | 11/2015 | |
| GB | 2554575 A | | 4/2018 | |
| GB | 2567409 A | | 4/2019 | |
| GB | 2567410 A | | 4/2019 | |
| GB | 2569206 A | | 6/2019 | |
| GB | 2569208 A | | 6/2019 | |
| JP | 2009145646 A | | 7/2009 | |
| WO | WO 2016/105283 A1 | | 6/2016 | |
| WO | WO-2016181126 A1 | * | 11/2016 | ......... G02B 27/0101 |
| WO | WO-2017213913 A1 | * | 12/2017 | ........... G02B 27/283 |
| WO | 2018078366 A1 | | 5/2018 | |
| WO | 2018100394 A1 | | 6/2018 | |
| WO | 2018100397 A1 | | 6/2018 | |

* cited by examiner

DISPLAY DEVICE AND SYSTEM

CROSS-REFERENCE TO RELATED APPLICATIONS

This application claims the benefit of priority under 35 U.S.C. § 119 of United Kingdom Patent Applications nos. 1712435.5, filed Aug. 2, 2017, and 1712436.3, filed Aug. 2, 2017, each of which is hereby incorporated herein by reference in its entirety.

FIELD

The present disclosure relates to a projector. More specifically, the present disclosure relates to a holographic projector and holographic projection system. Some embodiments relate to a head-up display and a head-mounted display. Some embodiments relate to a method of removing unwanted light in a holographic projection system, head-up display or head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM in transmission.

A holographic projector for imaging may be provided using the described technology. Such projectors have found application in head-up displays, "HUD", and head-mounted displays, "HMD", including near-eye devices, for example. There is disclosed herein an improved display device including a holographic projector.

SUMMARY

Aspects of the present disclosure are defined in the appended independent claims.

There is disclosed herein an improved HUD for an automotive vehicle. The HUD includes a picture generating unit arranged to generate a picture including information content, such as speed or navigation information, and an optical system arranged to form a virtual image of the information content. The virtual image of the information content is formed at a suitable viewing position for the driver such as within the driver's normal field of view whilst operating the automotive vehicle. For example, the virtual image of the information content may appear at a distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

Also disclosed is a method for providing a head-up display for a vehicle, the method including: generating a picture on a light receiving surface, the generating including representing a computer-generated hologram on a spatial light modulator; receiving light from a light source on the spatial light modulator; outputting from the spatial light modulator spatially-modulated light in accordance with a computer-generated hologram; and receiving the spatially-modulated light on the light receiving surface to form the picture on the light receiving surface. The method further includes imaging the picture using an optical system, wherein the imaging includes receiving light of the picture at an input of an optical system; guiding light of the picture from the input to an output along an optical path, wherein the optical path comprises: a first optical path from the input to the second mirror including a first transmission through the first mirror; and second optical path from the second mirror to the output including a reflection off the first mirror.

In summary, the picture generating unit of some embodiments comprises a holographic projector in which the picture is a holographic reconstruction of a computer-generated hologram. The picture is formed on a light receiving surface which acts as a display. A HUD based on the holographic projector described in full below is able to deliver a much greater contrast ratio than currently available competing technologies because of the efficiency of the holographic process and its inherent suitability for use with a laser light source. In some embodiments, the light receiving surface is plastic which is not a good material at dissipating heat. These embodiments are distinguished from systems based on more conventional display devices such as LCD which typically use glass (specifically, two glass plates to enclose the liquid crystals).

In summary, the optical system includes two reflectors and some embodiments of the optical system include a so-called z-fold optical configuration. A problem is that ambient light, including direct sunlight, can enter the HUD system through the aperture which is necessitated in the dashboard of the vehicle. The reflectors within the optical system typically have optical power which magnify the picture for the driver and define the virtual image distance. However, this optical power conversely focuses any sunlight which enters the HUD onto components of the optical system or even the display of the picture generating unit. This can cause vailing glare which significantly reduce the quality of the display or even optical wash out of the display. Highly concentrated sunlight within the HUD can also cause thermal damage to components of the HUD. For example, the picture generating unit may include a LCD which will be degraded when exposed to highly-concentrated sunlight.

Some embodiments use the windscreen of the vehicle as an optical combiner for combining the driver's view of the real world with the computer-generated information content. Using the windscreen of the vehicle as the optical combiner presents numerous optical and holographic challenges. For example, the windscreen may have a spatially-varying complex curvature. Systems using the windscreen as the optical combiner are distinguished from systems which use an additional optical combiner (such as a flat glass plate) which, for example, pops-up from the dashboard of the vehicle. In some embodiments, the optical combiner is an additional optical component rather than the windscreen.

The optical system disclosed herein includes a light-selective filter. In some embodiments, the light-selective filter is a laser-line selective filter and/or a polarisation selective filter on the optical path within the HUD. This helps remove sunlight from the HUD and, in particular, reduce the amount of sunlight reaching the picture generating unit. However, these embodiments also inevitably attenuate the light forming the information content. These embodiments are therefore highly unconventional because current HUD development is heavily focused on increasing the maximum brightness which can be delivered to the driver. Achieving a commercially acceptable contrast ratio is a major problem for HUD developers. Liquid crystal displays (LCD), for example, are significantly less efficient than the holographic projector of some embodiments because they already comprise multiple optical components—such as polarisers, filters, glass plates and wave plates—which reduce intensity. These conventional technologies cannot therefore afford to lose more of the light which forms the information content. There is therefore significant technical prejudice in the field to incorporating components, such as selective filters, in the HUD which attenuate the information content because this lowers overall brightness. The selective filter/s of some embodiments are found to be very effective at reducing damage within the HUD of the present disclosure and, in particular, improving the lifetime of the light receiving surface (especially when it is made of plastic) whilst not overly reducing the achievable luminance.

Some embodiments provide a HUD in which the picture generating unit and optical system are substantially coplanar. In summary, this is achieved by illuminating the second mirror of the optical system through the first mirror—i.e. in transmission. In some embodiments, the optical path within the optical system comprises plural interactions with the first mirror. In some embodiments, the plural interactions comprise a first interaction comprising transmission of light from the input to the second mirror and a second interaction comprising reflecting light from the second mirror to the output. Accordingly, a more compact HUD is provided and the picture generating unit may be readily shielded from sunlight in accordance with any number of designs which may be envisaged.

Some embodiments incorporating a filter or wave plate as a coating on one or both of the reflectors. These embodiments are advantageous because the filter/wave plate can be conveniently applied to one or both mirrors without introducing further complexities into the optical system. In some embodiments, a selective filter is coated on the first mirror so the unwanted ambient light is filtered from the system as close to source as possible reducing thermal concentration effects. In embodiments, the selective filtering is collectively formed on both mirrors so as to spread the thermal load.

There is provided a method of removing ambient light from a HUD for a vehicle, the method including filtering out non laser-line wavelength or wavelengths from an optical relay system of the HUD. There is also provided a method of removing ambient light from the HUD, the method including polarising the light on the optical path of the optical relay system. There is further provided a method of directing light of the picture of folded optical path HUD, the method comprising a first pass of the first mirror in transmission and a second pass of the first mirror in reflection.

In examples, the picture generating unit is not a holographic projector. There is therefore provided a head-up display for a vehicle, the head-up display comprising: a picture generating unit arranged to generate a picture on a light receiving surface; and an optical system arranged to image the picture, wherein the optical system comprises: an input arranged to receive light of the picture; an output arranged to output light forming an image of the picture; a first mirror and second mirror arranged to guide light from the input to the output along an optical path; a selective filter—such as a laser-line selective filter and/or a polarisation-selective filter—on the optical path.

There is also provided a head-up display for a vehicle, the head-up display comprising: a picture generating unit arranged to generate a picture on a light receiving surface; and an optical system arranged to image the picture, wherein the optical system comprises: an input arranged to receive light of the picture; an output arranged to output light forming an image of the picture; a first mirror and second mirror arranged to guide light from the input to the output along an optical path, wherein the optical path comprises: a first optical path from the input to the second mirror including a transmission through the first mirror; and second optical path from the second mirror to the output including a reflection off the first mirror.

Some embodiments relate to a HUD but the present disclosure is equally applicable to a HMD such as a helmet or glasses. In these embodiments, the optical combiner may be a visor or at least one window or lens of a pair of glasses—instead of a vehicle windscreen.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Reference is made throughout this disclosure to various "selective filters" including a laser-line selective filter and a polarisation-selective filter. The term "selective filter" is used to indicate a component having a response to light which is dependent on at least one parameter—such as wavelength or polarisation—characterising the light. In this disclosure, a "selective filter" selects light which can continue to propagate on the optical path described. That is, in accordance with this disclosure a "laser-line selective filter", for example, allows laser-line light to propagate on the optical path described but does not allow non laser-line light to propagate any further on the optical path. In other words, the "laser-line selective filter" removes non laser-line light from the optical system. For example, the "laser-line selective filter" may absorb non laser-line light. For example, a "laser-line selective filter" may be absorb all optical wavelengths except light having the laser-line wavelength. Alternatively, the filter may achieve this selective functionality by being preferentially transmissive or preferentially reflective, for example, to the laser-line light. Likewise, a "polarisation-selective filter" in accordance with this disclosure refers to a filter which removes light having the non-preferential polarisation from the optical system.

The term "laser-line" is used to refer to a narrow bandwidth having a centre wavelength and a full-wave half-maximum of less than 30 nm, optionally less than 15 nm, further optionally less than 5 nm.

The term "light of the picture" is used herein to refer to the light which forms the picture and emanates (for example, scattered) from the light receiving surface. In other words, the "light of the picture" is the light forming the picture. The "light of the picture" is imaged by the optical system and windscreen. The "light of the picture" may be monochromatic or polychromatic. The "light of the picture" may be composite colour. For example, the "light of the picture" may comprise red, green and blue light. The "light of the picture" may be polarised.

Although reference is made throughout to "mirrors", it may be understood that these elements are not necessarily reflective to all colours and all polarisation states. That is, although an element may be labelled herein a "mirror", that element may be selectively reflective and may exhibit non-reflectivity to light having certain characteristics. For example, an element may still be referred to herein as a "mirror" even if that element is only reflective to one colour or polarisation state, for example.

Reference is made to "coatings" on mirrors but it is well-known in the art that each coating—e.g, a wavelength-selective filter—may comprises a plurality of dielectric layers or individual dielectric coatings. It will be understood that a mirror may comprise multiple components such as coatings or filters. The mirror will have a reflective component. In embodiments, the filters disclosed herein are the reflective component. In other embodiments, the filters are not the reflective component and cooperate with the reflective component to provide the functionality described.

The term "hologram" is used to refer to the recording which contains amplitude and/or phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2□) which represents the amount of phase retardation provided by that pixel. For example, a pixel of the spatial light modulator described as having a phase value of □□□ will change the phase of received light by □□□ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
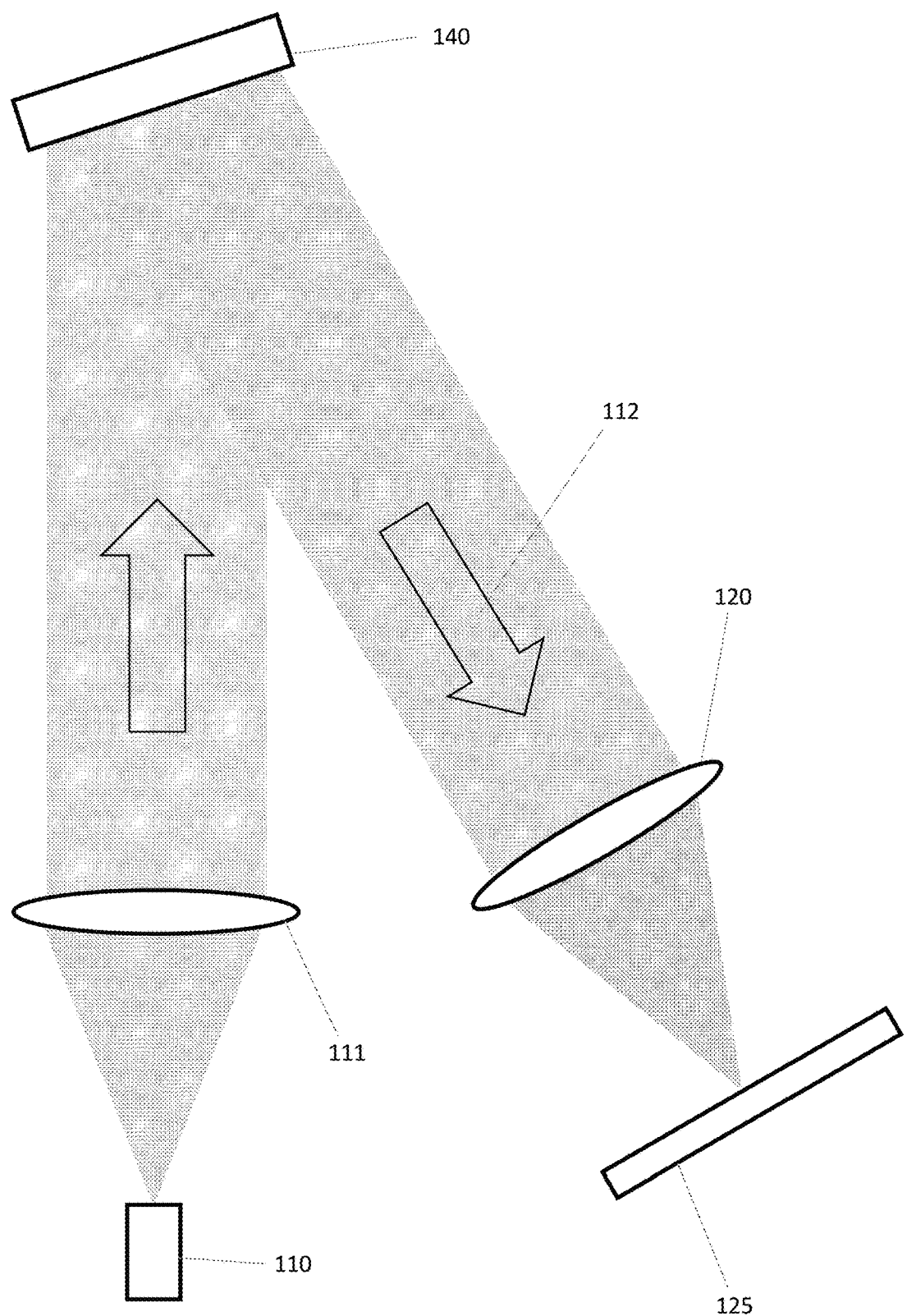
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency)

domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
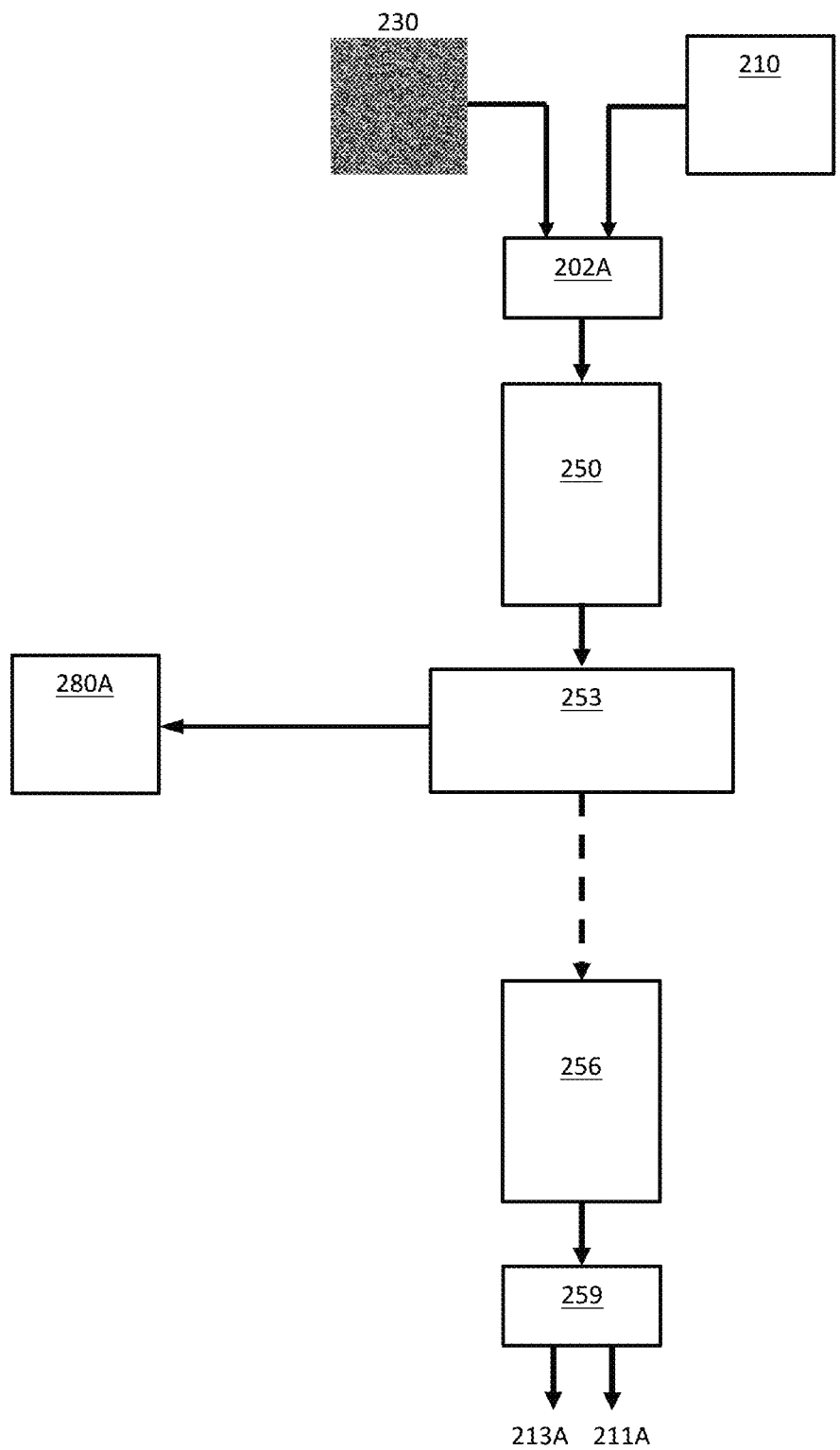
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
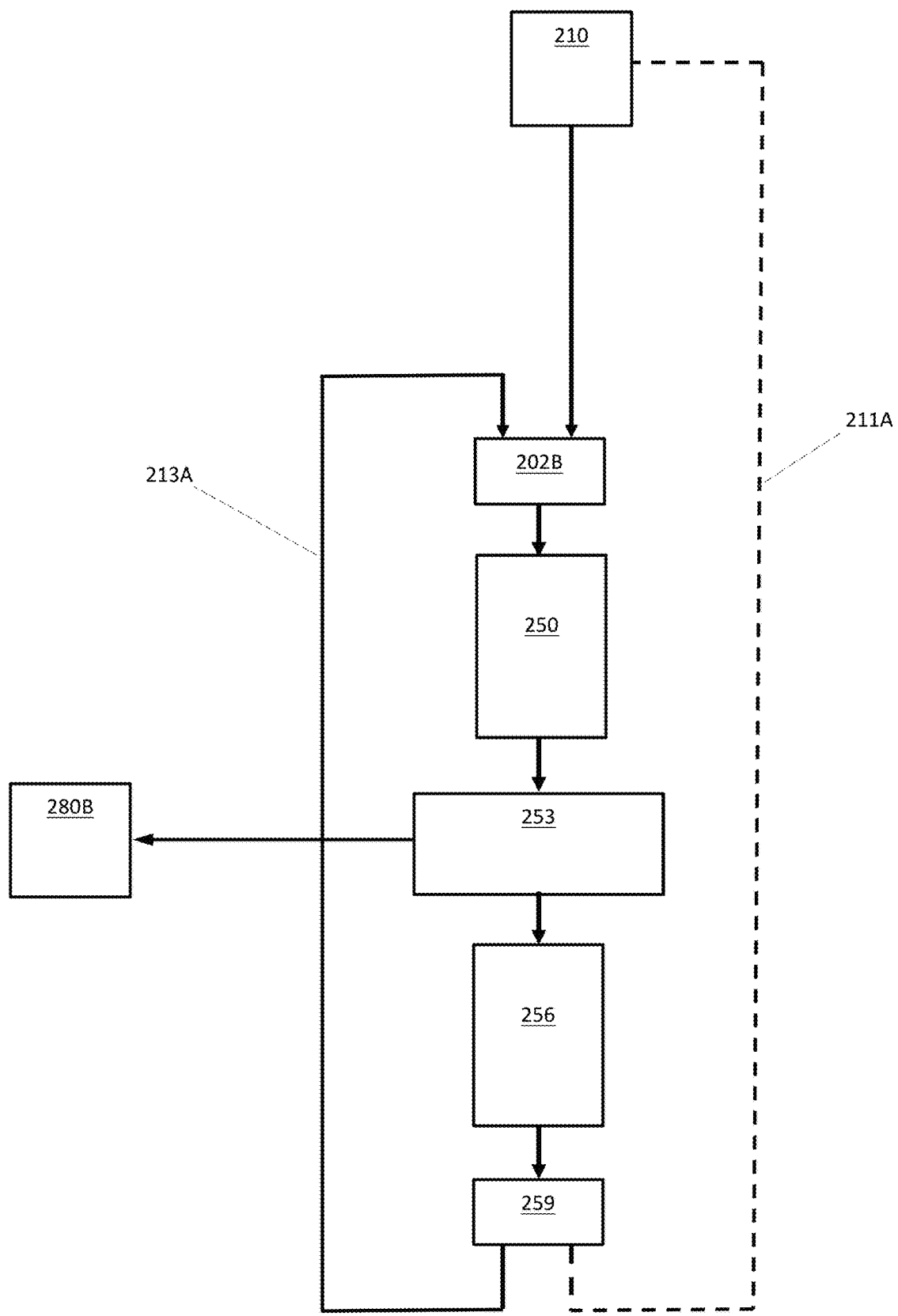
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
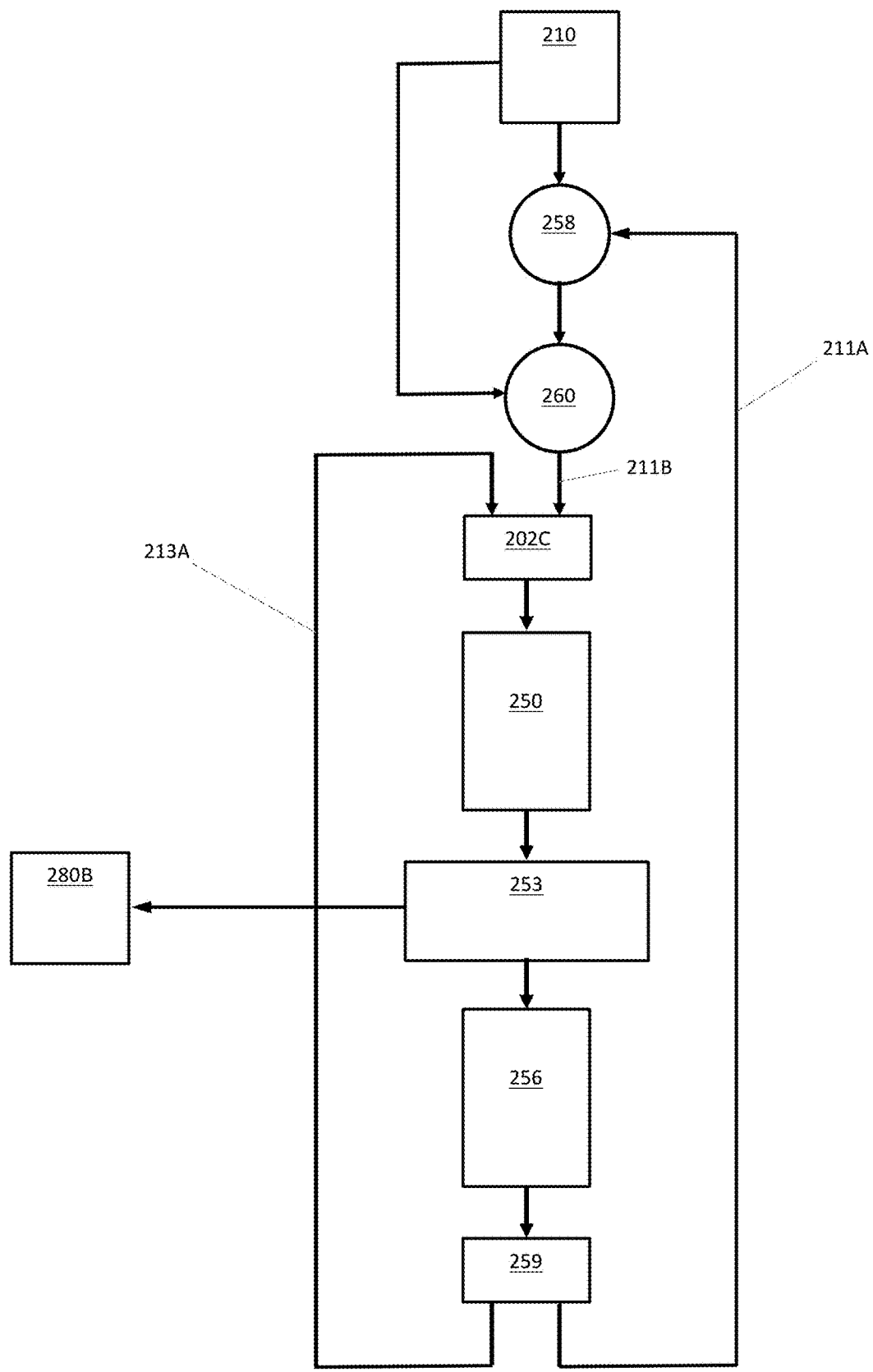
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor □ is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, It is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
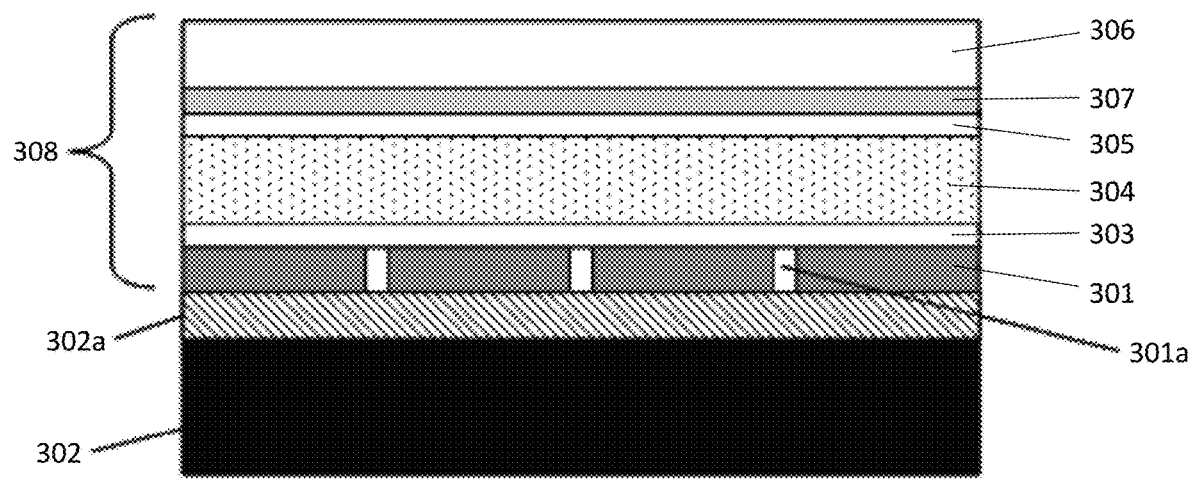
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
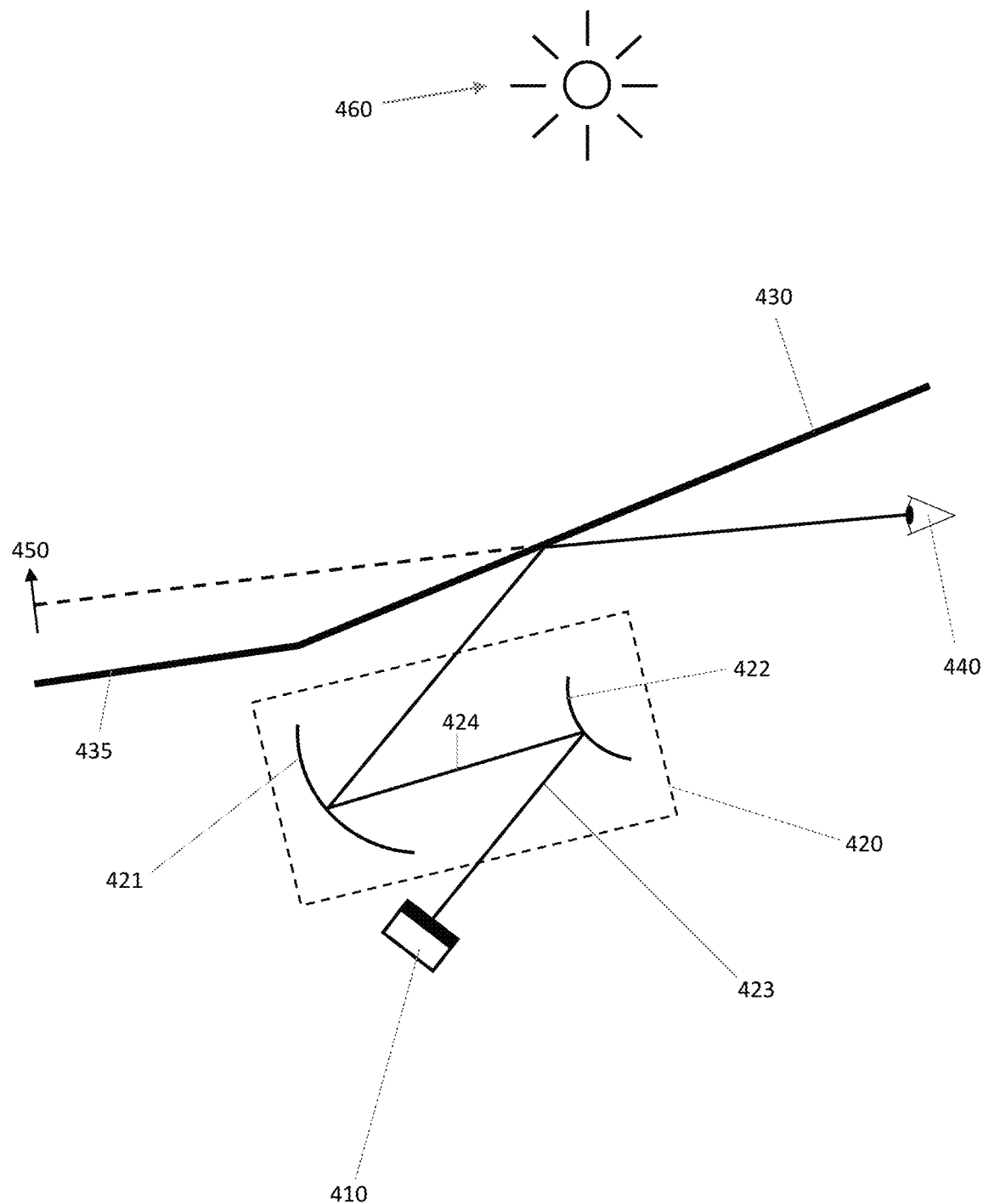
FIG. 4 shows a HUD in a vehicle such as a car.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

The PGU 410 comprises a light source, a light receiving surface and a processor (or computer) arranged to computer-control the image content of the picture. The PGU 410 is arranged to generate a picture, or sequence of pictures, on the light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture.

The PGU 410 of the present disclosure comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

Figure 5:
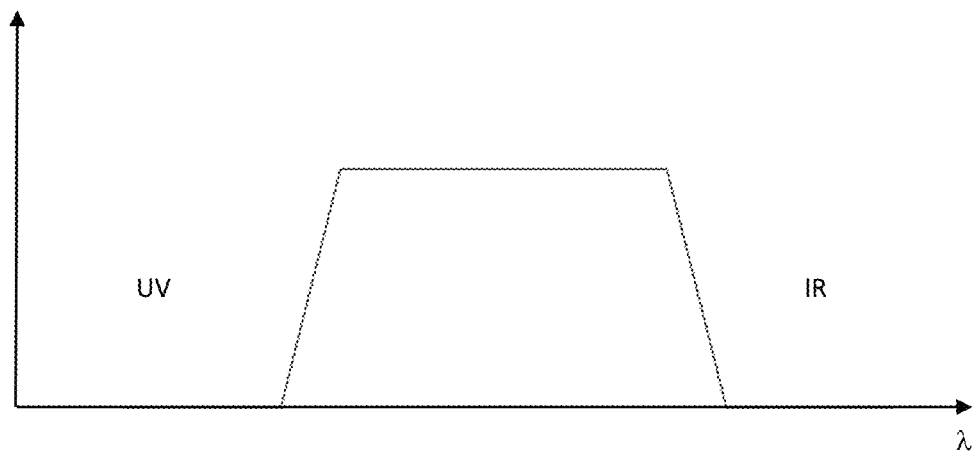
FIG. 5 illustrates the optical performance of an example "hot/cold mirror"

The dashboard of the vehicle comprises an aperture because the HUD requires an optical path (preferably, an unobstructed optical path) to the windscreen. However, this optical path between the windscreen and HUD equally allows ambient light, such as sunlight 460, to get into the HUD. This causes various problems as described above. In examples, the first mirror is therefore a cold mirror arranged to filter out infrared radiation. The cold mirror may reflect visible light but transmit infrared, "IR", light. In other examples, the first mirror 421 is a so-called hot/cold mirror which at least partially filters out IR and ultraviolet, "UV", light. FIG. 5 shows the reflectance (y-axis) of an example hot/cold mirror as a function of optical wavelength (x-axis).

Light-Selective Filtering

Figure 6:
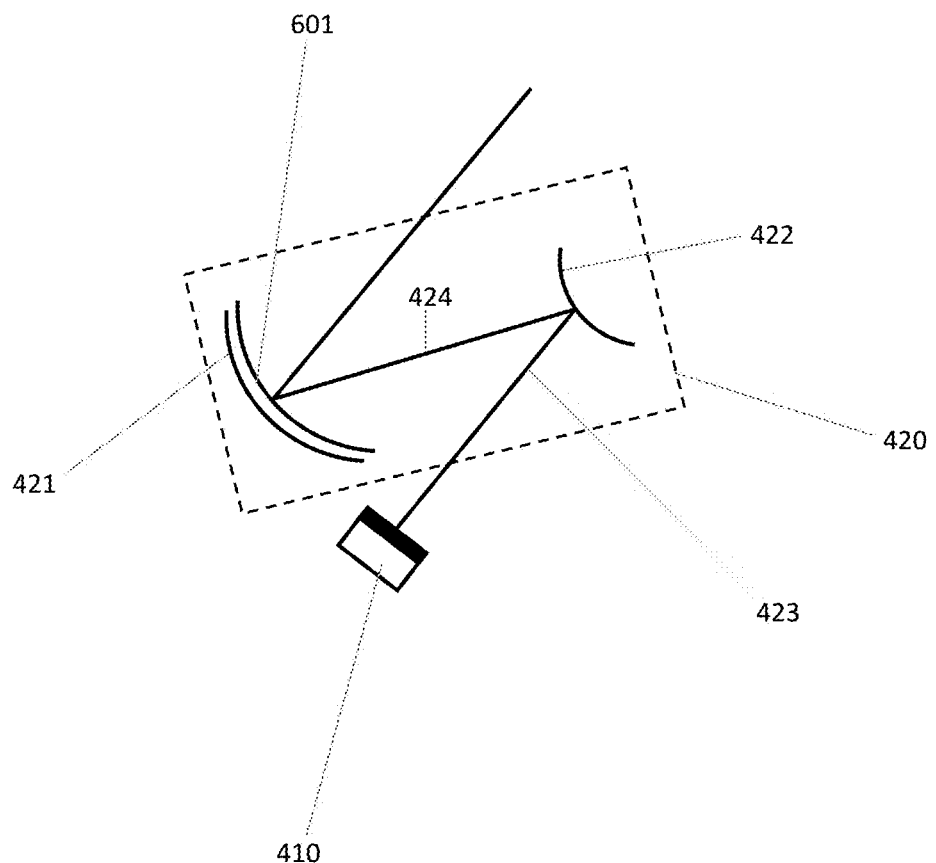
FIG. 6 shows a HUD including a laser-line selective filter in accordance with some embodiments.

FIG. 6 illustrates an embodiment of the present disclosure. Features of FIG. 6 corresponding to features of FIG. 4 are not described again. However, in this embodiment, a laser-line selective filter 601 is provided on the optical path within the optical system 420. That is, a laser-line selective filter 601 is provided on the optical path from the input of the optical system 420 to the output of the optical system 420.

The laser-line selective filter 601 is selective at the wavelength of the light source of the PGU 410. More specifically, the laser-line selective filter 601 is arranged to allow the propagation of light at the wavelength of the light forming the picture through the optical system but filter out other optical wavelengths including other visible wavelengths. The optical performance of the laser-line selective filter 601 differs from that of a cold mirror, hot mirror or hot/cold mirror in that the laser-line selective filter 601 additionally filters out some visible wavelengths. The optical performance of the laser-line selective filter further differs from that of a cold mirror or hot/cold mirror by virtue of the narrow bandwidth over which the laser-line selective filter is transmissive. In this embodiment, the laser-line selective filter is transmissive within a wavelength band centred at a centre wavelength and having a full-wave half-maximum of less than 30 nm, such as less than 15 nm or less than 5 nm.

There is therefore provided a head-up display for a vehicle comprising a picture generating unit and an optical system. The picture generating unit is arranged to generate a picture on a light receiving surface. The picture generating unit comprises a light source arranged to emit light at a first wavelength. The picture generating unit further comprises a spatial light modulator arranged to receive the light from the light source and output spatially-modulated light in accordance with a computer-generated hologram represented on the spatial light modulator to form a corresponding picture on the light receiving surface. The picture generating unit further comprises a hologram processor arranged to output the computer-generated hologram to the spatial light modulator. The optical system is arranged to image the picture. The optical system comprises an input arranged to receive light of the picture and an output arranged to output light forming an image of the picture. The optical system further comprises a first mirror and second mirror arranged to guide light from the input to the output along an optical path. The optical system further comprises a laser-line selective filter on the optical path. The laser-line selective filter is selective at the first wavelength. In some embodiments, the laser-line selective filter is a coating on the first mirror or a coating on the second mirror.

In some embodiments, the laser-line selective filter is substantially transmissive at the first wavelength and substantially non-transmissive at other optical wavelengths. In other embodiments, the laser-line selective filter is substantially reflective at the first wavelength and substantially non-reflective at other optical wavelengths; in these embodiments, the laser-line selective filter may be the reflective component of the first mirror and/or second mirror.

Figure 7:
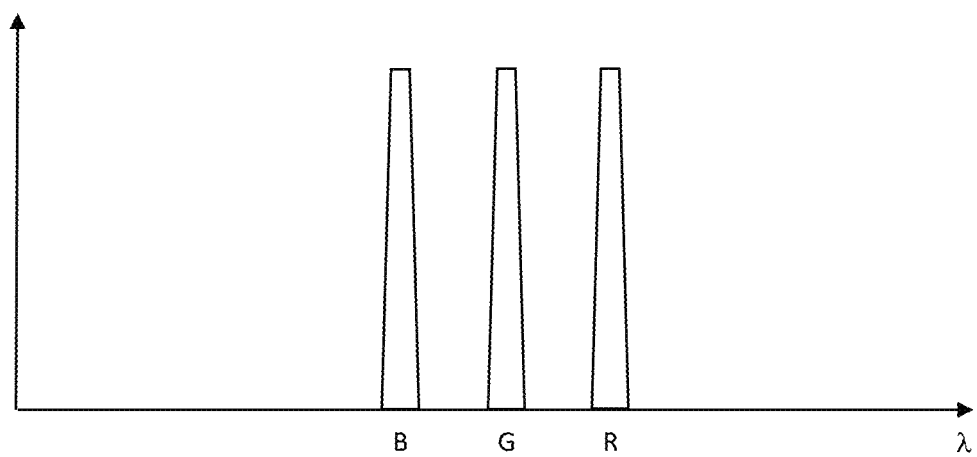
FIG. 7 illustrates the performance of a laser-line selective filter comprising three centre wavelengths in accordance with some embodiment.

FIG. 7 illustrates the performance of a laser-line selective filter which is also selective at a second wavelength and a third wavelength, wherein the second wavelength is not equal to the first wavelength and the third wavelength is not equal to the first wavelength or second wavelength, in accordance with some embodiments. Accordingly, in some embodiments, the laser-line selective filter is substantially transmissive at the first wavelength, second wavelength and third wavelength, and substantially non-transmissive at other optical wavelengths. In other embodiments, the laser-line selective filter is substantially reflective at the first wavelength, second wavelength and third wavelength, and substantially non-reflective at other optical wavelengths; in these embodiments, the laser-line selective filter may be the reflective component of the first mirror and/or second mirror.

In some embodiments, a first laser-line selective filter is provided on the first mirror and a second laser-line selective filter is provided on the second mirror, wherein the first laser-line selective filter is selective at a first wavelength and the second laser-line selective filter is selective at a second wavelength not equal to the first wavelength. These embodiments spread the thermal load across the two mirrors. The first or second mirror may also be selective at a third wavelength not equal to the first or second wavelength.

In some embodiments, the HUD provides a multicolour display. In these embodiments, the picture generating unit further comprises a second light source, a second spatial light modulator, a third light source and a third spatial light modulator. The second light source is arranged to emit light at the second wavelength. The second spatial light modulator is arranged to receive the light at the second wavelength from the second light source and output second spatially-modulated light in accordance with a second computer-generated hologram represented on the second spatial light modulator to form a corresponding second picture on the light receiving surface. The third light source is arranged to emit light at the third wavelength. The third spatial light modulator is arranged to receive the light at the third wavelength from the third light source and output third spatially-modulated light in accordance with a third computer-generated hologram represented on the third spatial light modulator to form a corresponding third picture on the light receiving surface.

In some embodiments, the HUD provides a composite colour display. In these embodiments, the picture, second picture and third picture are substantially coincident and the optical system is arranged to image the picture, first picture and second picture. In some embodiments, the optical system is arranged to simultaneously image the picture, first picture and second picture. It may be said that the light of the picture comprises light of a plurality of wavelengths.

In some embodiments, the HUD provides an RGB colour display wherein the first wavelength is 425+/−10 nm, the second wavelength is 525+/−10 nm and the third wavelength is 640+/−10 nm.

In some embodiments, each light source emits substantially monochromatic light, optionally, wherein each light source is a laser. It may be understood that these embodiments provide synergy with the laser-line selective filter's. In some embodiments, the centre wavelength of the light emitted by each laser coincides with a centre wavelength of a laser-line selective filter.

In some embodiments, a polarisation-selective filter is included on the optical path. The polarisation-selective filter may be included instead of the laser-line selective filter or as well as the laser-line selective filter. In some embodiments, the polarisation-selective filter is a wire-grid polariser.

Figure 8:
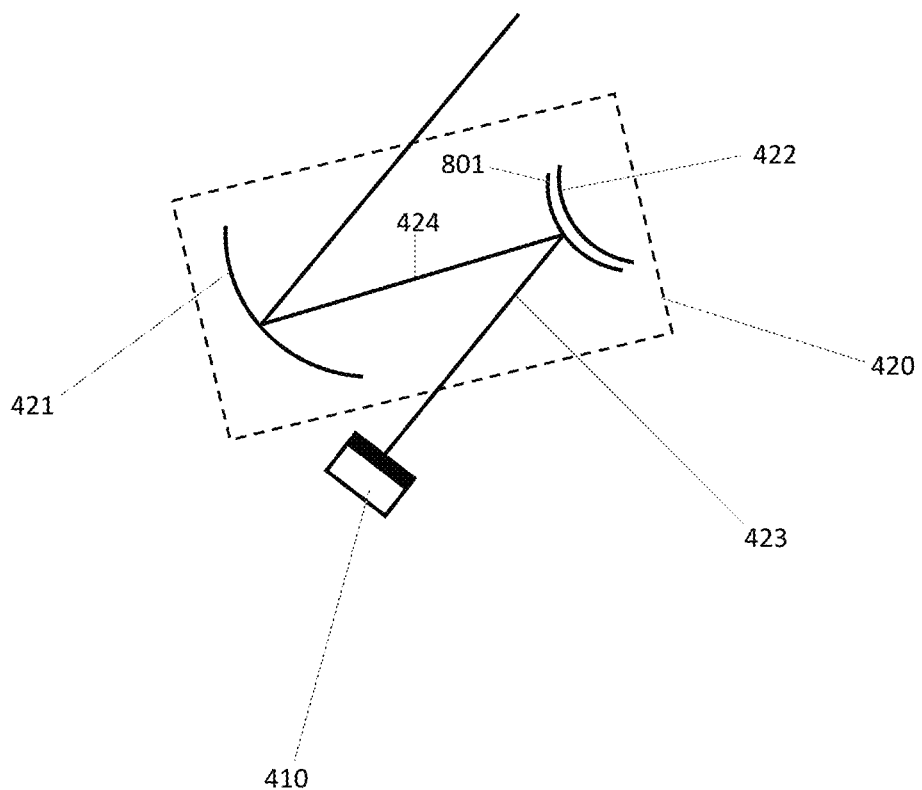
FIG. 8 shows a HUD including a polarisation-selective filter in accordance with some further embodiments.

FIG. 8 shows a HUD including a polarisation-selective filter 801 in accordance with some embodiments. Features of FIG. 8 corresponding to features of FIG. 4 are not described again. However, in this embodiment, a polarisation-selective filter 801 is provided on the optical path within the optical system 420. That is, a polarisation-selective filter 801 is provided on the optical path from the input of the optical system 420 to the output of the optical system 420. In the embodiment shown in FIG. 8, the polarisation-selective filter 801 is provided on the second mirror 422 but it may equally be provided on the first mirror 421.

The polarisation-selective filter 801 is arranged to allow the propagation of the light polarised in a first direction, including the light of the picture (that is, the light forming the picture), through the optical system 420. The polarisation-selective filter is arranged to filter out (i.e. remove from the optical system) light polarised in a second direction or filter out the component of unpolarised light which is polarised in the second direction, wherein the first direction is perpendicular to the second direction. For example, the polarisation-selective filter 801 may absorb light polarised in the second direction. Again, in some embodiments, the light forming the picture which is output by the optical system is incident upon the windscreen at Brewster's angle (also known as the polarisation angle) or within 5 degrees of Brewster's angle such as within 2 degrees of Brewster's angle. It may be understood that, in these embodiments, the windscreen reflects substantially all light polarised in the first direction. In other words, the first direction is such that substantially all the (polarised) light forming the picture from the optical system is reflected by the windscreen. The word substantially is used to reflect that in examples in which the light is incident upon the windscreen at an angle near the Brewster's angle, perfect polarisation separation may not be achieved. In some embodiments, the light is incident upon the windscreen at an angle of 55 to 75 degrees such as 60 to 70 degrees.

There is therefore provided a head-up display for a vehicle comprising a picture generating unit and an optical system. The picture generating unit is arranged to generate a picture on a light receiving surface. The picture generating unit comprises a light source arranged to emit light at a first wavelength, wherein the light is polarised in a first direction. The picture generating unit further comprises a spatial light modulator arranged to receive the light from the light source and output spatially-modulated light, polarised in the first direction, in accordance with a computer-generated hologram represented on the spatial light modulator to form a corresponding picture on the light receiving surface. The picture generating unit further comprises a hologram processor arranged to output the computer-generated hologram to the spatial light modulator. The optical system is arranged to image the picture. The optical system comprises an input arranged to receive light of the picture and an output arranged to output light forming an image of the picture. The optical system further comprises a first mirror and second mirror arranged to guide light from the input to the output along an optical path. The optical system further comprises a polarisation-selective filter on the optical path. The polarisation-selective filter is selective to light polarised in the first direction.

In some embodiments, the polarisation-selective filter is a coating on the first mirror or a coating on the second mirror. These embodiments are advantageous because the polarisation-selective filter can be conveniently applied to one or both mirrors without introducing further complexities into the optical system.

In some embodiments, the polarisation-selective filter is substantially transmissive to light polarised in the first direction and substantially non-transmissive to light polarised in a second direction, wherein the first direction is perpendicular to the second direction. In other embodiments, the polarisation-selective filter is substantially reflective to light polarised in the first direction and substantially non-reflective to light polarised in a second direction, wherein the first direction is perpendicular to the second direction; in these embodiments, the polarisation-selective filter may be the reflective component of the first mirror and/or second mirror.

The polarisation-selective filter may be incorporated in displays providing a monochromatic picture or displays providing a polychromatic picture as described above. It will be understood that the optical performance of the polarisation-selective filter may be wavelength dependent. For example, the polarisation-selective filter may only be polarisation-selective within a range of wavelengths or within plural ranges of wavelengths. In embodiments, the light of the picture comprises light of a plurality of wavelengths, as described above. The polarisation-selective filter is polarisation selective at the plurality of wavelengths. In some embodiments, the polarisation-selective filter is polarisation selective at the first wavelength, second wavelength and third wavelength. It may be understood that, like the laser-line selective filter, the polarisation-selective filter may have a centre wavelength or wavelengths at which filtering is optimised. The centre wavelength or wavelengths may include a bandwidth in the manner described above.

Figure 9:
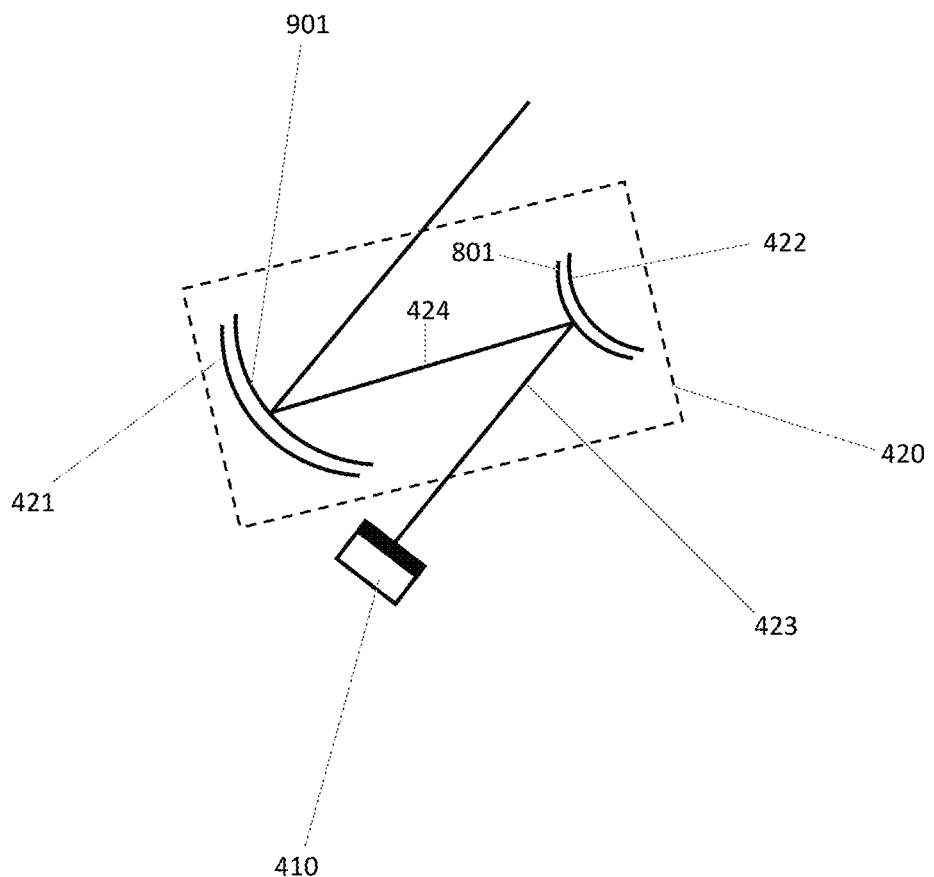
FIG. 9 shows a HUD including a laser-line selective filter and a polarisation-selective filter accordance with some further embodiments.

Again, in some embodiments, there is provided a polarisation-selective filter and a laser-line selective filter (as described above) on the optical path. FIG. 9 shows an embodiment in which a laser-line selective filter 901 is provided as a coating on the first mirror 421 and a polarisation-selective filter 801 is provided as a coating on the second mirror 422. In other embodiments, the laser-line selective filter is a coating on the second mirror 422 and the polarisation selective filter is a coating on the first mirror 421. In some embodiments, the laser-line selective filter and polarisation selective filter are components of the same mirror. In embodiments, the light of the picture comprises light of a plurality of wavelengths, as described above.

It may be understood from the embodiments described that the optical system of the head-up display comprises at least one light-selective filter. The light-selective filter may comprise a laser-line selective filter and/or a polarisation selective filter.

Compact HUD

Figure 10A:
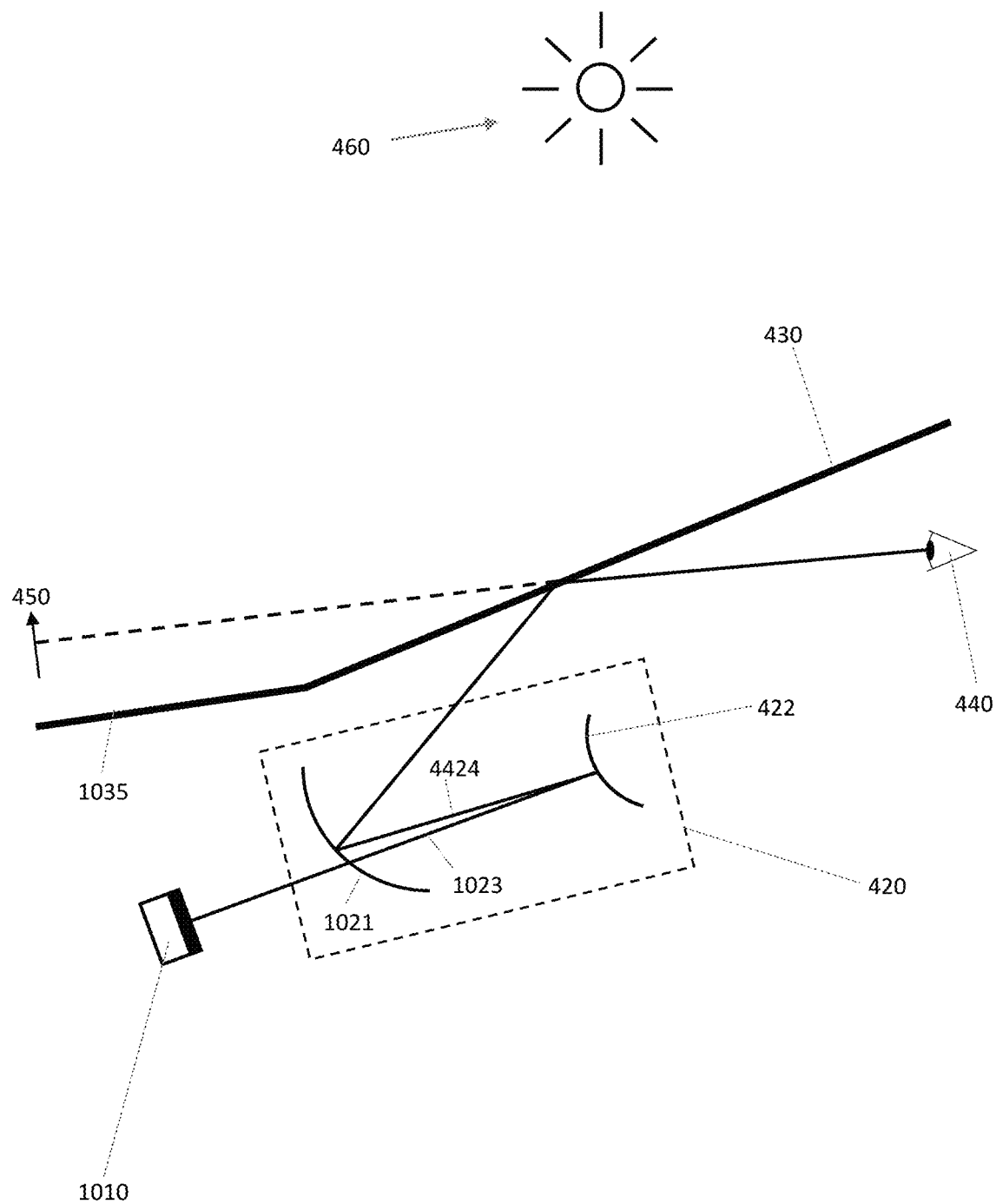
FIG. 10A shows a compact HUD in accordance with some further embodiments.

FIG. 10A shows a HUD in accordance with some embodiments. Features of FIG. 10A corresponding to features of FIG. 4 are not described again. However, in this embodiment, the first mirror 1021 has a different optical performance and the PGU 1010 is positioned differently such that light from the PGU 1010 travelling to the second mirror 422 follows a different first optical path 1023 (or first optical path component). Specifically, the first optical path 1023 includes a transmission through the first mirror 1021. That is, the first mirror 1021 transmits light directly received from the PGU. However, as shown in FIG. 10, the first mirror 1021 reflects light received from the second mirror 1022. This compact configuration may be provided in any number of ways including, for example, manipulating properties of light such as polarisation using components such as a quarter waveplate and polarisation-selective elements. One example of how to provide this compact configuration is described below with reference to FIG. 11 but the present disclosure is not limited to this one example.

There is therefore provided a head-up display for a vehicle comprising a picture generating unit and an optical system. The picture generating unit is arranged to generate a picture on a light receiving surface. The picture generating unit comprises a light source arranged to emit light. The picture generating unit further comprises a spatial light modulator arranged to receive the light from the light source and output spatially-modulated light in accordance with a computer-generated hologram represented on the spatial light modulator to form a corresponding picture on the light receiving surface. The picture generating unit further comprises a hologram processor arranged to output the computer-generated hologram to the spatial light modulator. The optical system is arranged to image the picture. The optical system comprises an input arranged to receive light of the picture and an output arranged to output light forming an image of the picture. The optical system further comprises a first mirror and second mirror arranged to guide light from the input to the output along an optical path. The optical path includes a first optical path from the input to the second mirror including a transmission through the first mirror. The optical path also includes a second optical path from the second mirror to the output including a reflection off the first mirror.

In these embodiments, the PGU 1010, first mirror 1021 and second mirror 1022 may be arranged on a common straight-line axis or may be substantially coplanar. Accordingly, a more compact HUD may be provided.

Figure 10B:
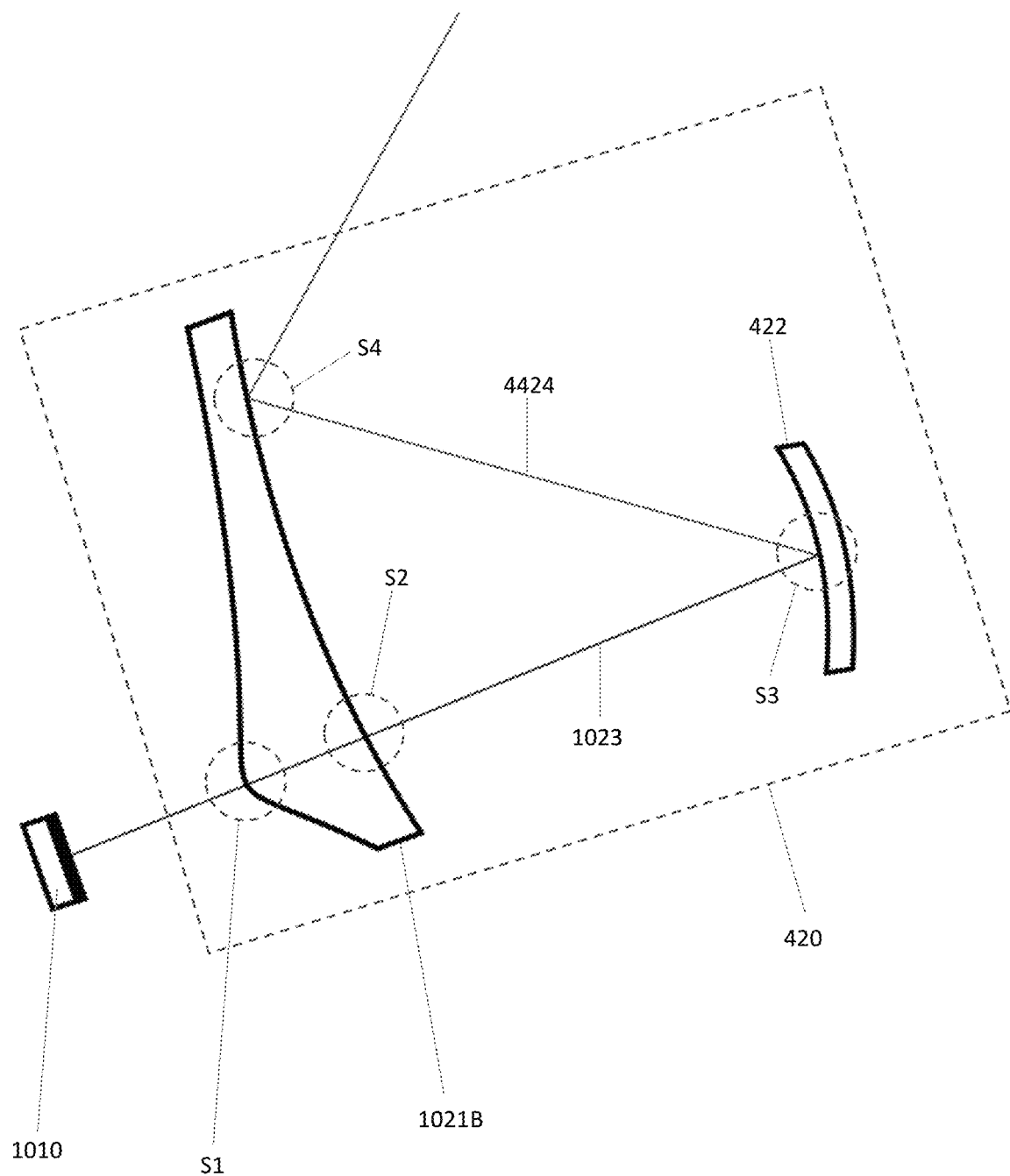
FIG. 10B shows another compact HUD in accordance with yet further embodiments.

FIG. 10B shows a further improvement in which the first surface S1 of the first mirror 1021B which receives light of the picture is modified—e.g. shaped such as curved—to provide additional optical power. The inventors have recognised that in the configuration of FIG. 10A, the first surface S1 of the first mirror 1021B can be used to provide a further improved system. In this embodiment, the first surface S1 of the first mirror 1021B is shaped to provide additional optical power such that the overall magnification achieved by the optical system 420 may be increased or the optical demands on the reflective surfaces of the first mirror 1021 and second mirror 422 for magnification may be relaxed. The first surface S1 of the first mirror may have a concave or a convex shape. The second surface S2 of the first mirror may also contribute to the optical processing provided by the optical system 420. The second surface S2 of the first mirror 1021B may also have a concave or a convex shape. In embodiments, the first surface S1 and second surface S2 are not parallel faces. The difference in radius of curvature between S1 and S2 provides magnification. In FIG. 10B, the radius of curvature of S1 is less than the radius of curvature of S2. As shown in FIG. 10B, light of the picture interacts with three surfaces of the first mirror, S1, S2 and S4 and one surface, namely surface S3, of the second mirror 422. Each surface S1, S2, S3 and S4 may provide optical power contributing towards the overall magnification achieved by the optical system 420. In contrast to conventional z-fold configurations, four surfaces rather than two may be used to contribute to the optical processing, including magnification, provided by the optical system. In some embodiments, the optical power provided by each surface S1, S2, S3 and S4 is different. In some embodiments, the radius of curvature of each surface S1, S2, S3 and S4 is different.

Figure 11:
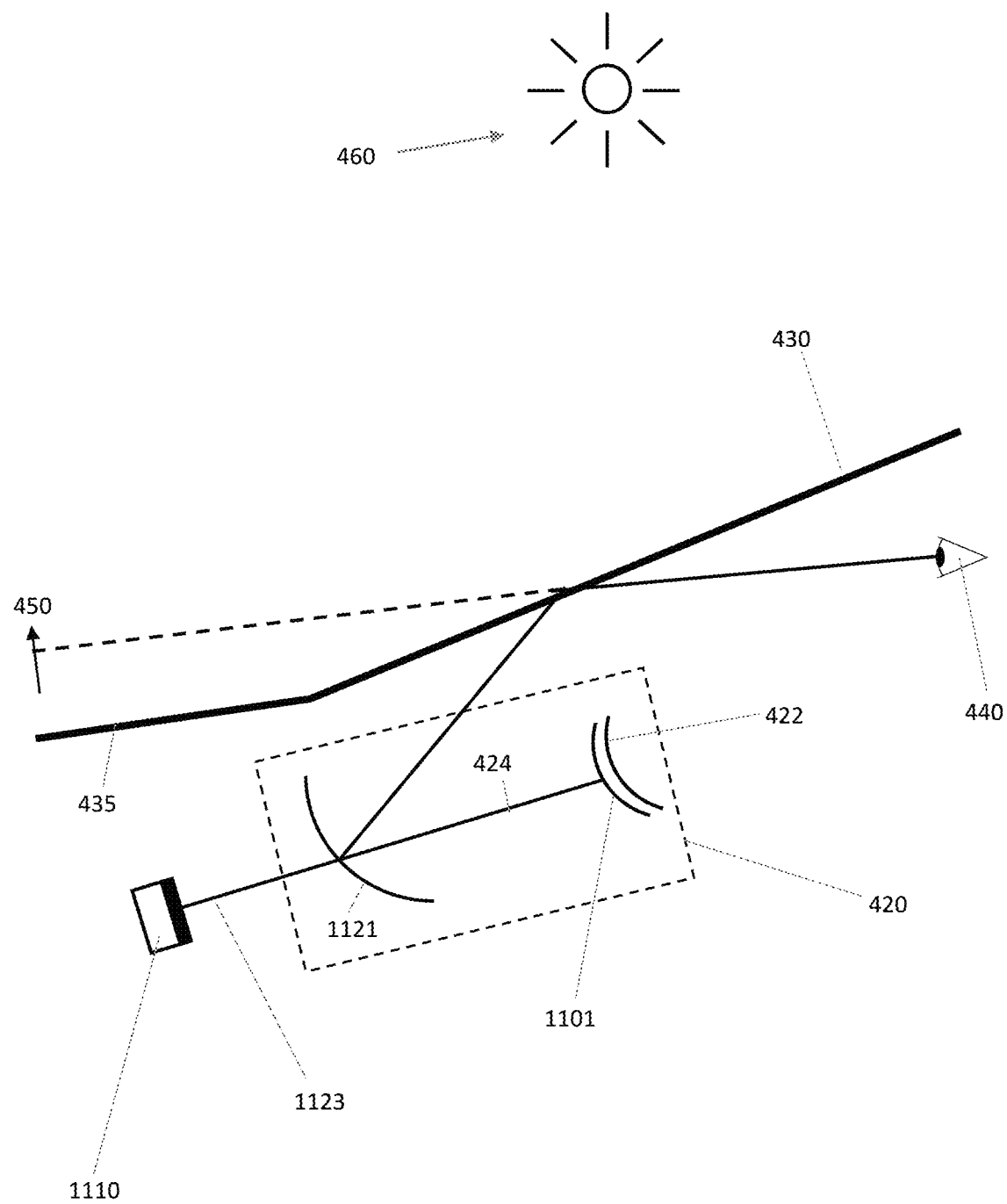
FIG. 11 shows another compact HUD including a quarter wave-plate in accordance with some further embodiments.

FIG. 11 illustrates an embodiment in which polarisation is manipulated in order to provide the compact geometry described herein. FIG. 11 shows a substantially coplanar arrangement by way of example only. The light of the picture received by the input of the optical system is polarised in a first direction. The first mirror 1121 is substantially transmissive to light polarised in the first direction and substantially reflective to light polarised in a second direction, wherein the second direction is perpendicular to the first direction. It may be said that the first mirror 1121 is polarisation-selective to indicate that the optical performance of the first mirror 1121 is polarisation-dependent. It may also be said that the reflectivity of the first mirror (to light of the picture) is dependent on polarisation. A quarter-waveplate 1101 is disposed between the first mirror 1121 and second mirror 422 such that the light from the PGU transmitted through the first mirror 1121 makes two passes of the quarter-waveplate 1101 before being incident upon the first mirror 1121 for the second time. Two passes of the quarter-waveplate 1101 rotate the polarisation of the light by $\square$/2. Accordingly, the light of the picture is polarised in the second direction when it meets the first mirror 1121 for the second time. Therefore, the first mirror 1121 reflects the light received from the second mirror 422.

In embodiments, the features of FIGS. 10B and 11 are combined. Specifically, in embodiments, the configuration of FIG. 10B includes the quarter-waveplate 1101 of FIG. 11, and the first mirror 1021B and second mirror 422 of FIG. 10B are polarisation-dependent as described with reference to FIG. 11.

In some embodiments, the light source is a laser and the picture generating unit is arranged to preserve the polarisation of the light of the picture. In these embodiments, the optical system therefore receives polarised light. In some embodiments, the optical system also output polarised light. In some embodiments, the input light and output light of the optical system are polarised in the same direction. In other embodiments, the polarisation of the input light and is perpendicular to the polarisation of the output light of the optical system. In some embodiments, the light input to the optical system is p-polarised and the light output by the optical system is s-polarised.

Accordingly, in some embodiments, the optical system comprises a quarter-waveplate positioned between the first mirror and second mirror, wherein the first optical path component includes a first pass of the quarter-waveplate and the second optical path component includes a second pass of the quarter-waveplate. In some embodiments, the quarter-waveplate is a coating on the second mirror. In some embodiments, the quarter-waveplate is a polymer waveplate. These embodiments are advantageous over embodiments which use more conventional waveplates because of the higher angle tolerance that is provided. This tolerance is good for the compact geometry disclosed herein because light traverses the waveplate at different angles.

Figure 12:
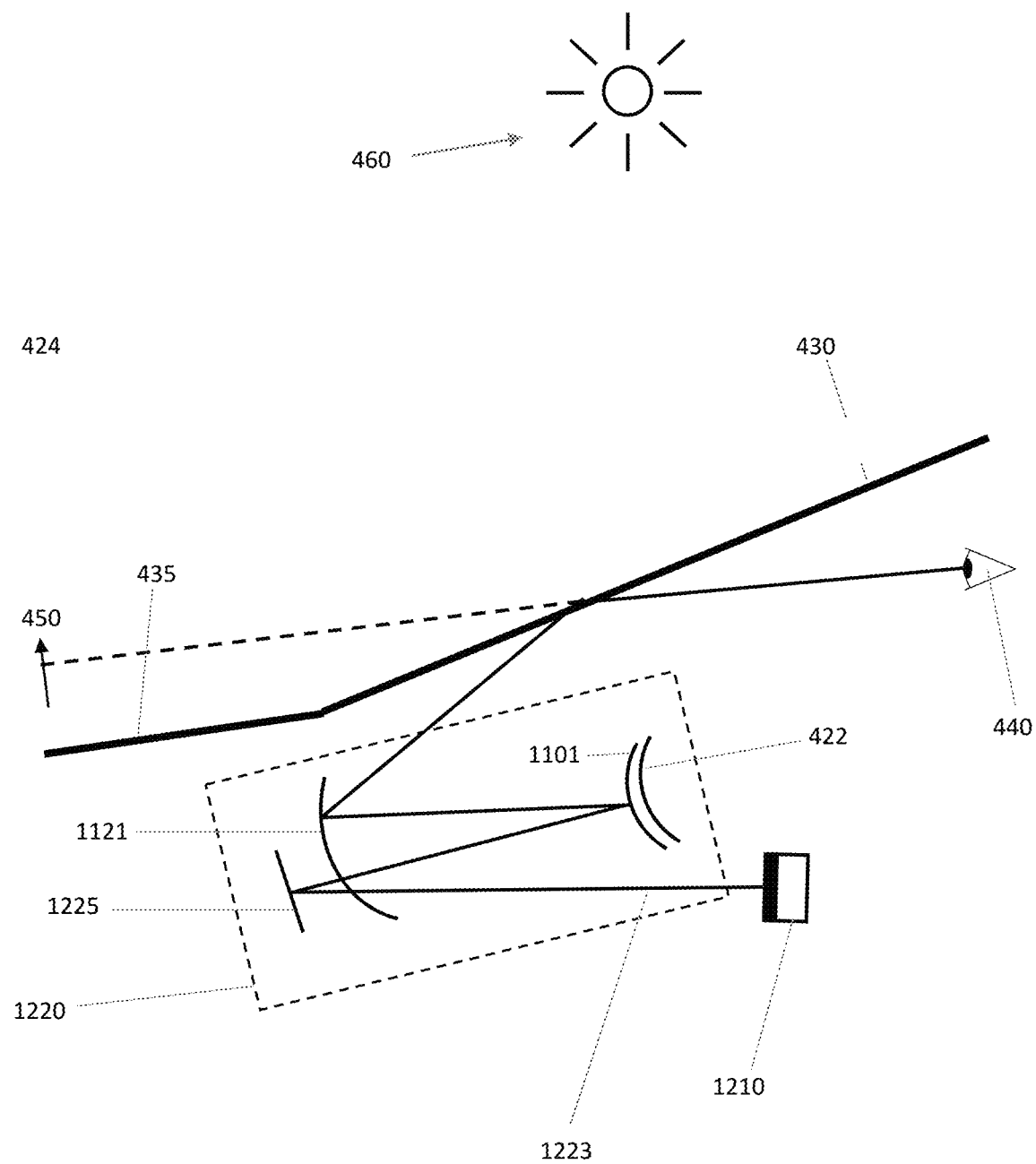
FIG. 12 shows another compact HUD including a quarter wave-plate in accordance with yet further embodiments.

FIG. 12 shows an embodiment in which the optical system 1220 comprises a third mirror 1225 included to provide a further fold to the optical path of the optical system thereby providing greater flexibility regarding the position of the PGU 1210. This is useful because space is at a premium in vehicles and the internal configuration of vehicles varies greatly between models and between manufacturers. The third mirror 1225 may be a conventional mirror. In some embodiments, the third mirror 1225 is not polarisation-selective—that is, it is equally reflective to light polarised in the first direction and light polarised in the second direction. The third mirror is substantially reflective to at least light of the picture which is polarised in the first direction.

In another embodiment, the third mirror 1225 is a reflective screen incorporating phosphors or quantum dots which perform a wavelength conversion. In an embodiment, the PGU 1210 emits UV or deep blue light and the reflective screen converts the light to a different colour such as a different visible colour. Accordingly, in embodiments, the third mirror 1225 includes a component, such as a phosphor or quantum dots, which perform a wavelength conversion.

In other respects, the embodiment of FIG. 12 is similar to the embodiment of FIG. 11. Specifically, the first mirror 1121 is transmissive to light polarised in the first direction and reflective to light polarised in the second direction. A quarter-waveplate 1101 is disposed between the first mirror 1121 and second mirror 422 such that light of the picture transmitted through the first mirror 1121 makes two passes of the quarter-waveplate 1101 before being incident upon the first mirror 1121 for the final time. Two passes of the quarter-waveplate 1101 rotate the polarisation of the light by $\square/2$. Accordingly, the light of the picture is polarised in the second direction when it meets the first mirror 1121 for the final time. Therefore, the first mirror 1121 reflects the light received from the second mirror 422.

Accordingly, in some embodiments, the optical system 1220 further comprises a third mirror 1225 on the optical path. The first optical path includes a second transmission through the first mirror 1121 and a reflection off the third mirror 1225. The optical system therefore comprises three mirrors and the optical path from the input to the output of the optical system includes two transmissions through the first mirror 1121 and one reflection off the first mirror 1121.

In operation, the input of the optical system 1220 of FIG. 12 receives light polarised in a first direction from the PGU 1210. Within the optical system 1220, the light is first transmitted through a first region of the first mirror 1121. The light is then reflected by the third mirror 1225 through a second region of the first mirror 1121 towards the second mirror 422. The quarter wave-plate 1101 between the first mirror 1121 and second mirror 422 rotates the polarisation direction of the light by $\square/4$ twice. The second mirror 422 directs the light to a third region of the first mirror 1121 which reflects the light to the output of the optical system 1220. The light output from the optical system 1220 is at least partially reflected by the windscreen 430 to the user 440 of the head-up display.

In embodiments, the additional features of FIG. 12 are combined with the features of FIG. 10B. Specifically, in embodiments, the third mirror 1225 is incorporated into FIG. 10B such that light of the picture makes two passes of S1 and yet further magnification is provided.

The embodiments described with reference to FIGS. 10 to 12 encompass displays arranged to provide colour pictures. That is, in some embodiments, the light of the picture is polychromatic. For example, in embodiments, the light of the picture comprises light of a first wavelength, light of a second wavelength and light of a third wavelength, wherein the second wavelength is not equal to the first wavelength and the third wavelength is not equal to the first wavelength or second wavelength. It may be understood that, in these embodiments, the described optical performance of the various components occurs at each wavelength component of the light of the picture. For example, if the light of the picture comprises light of a first wavelength, light of a second wavelength and light of a third wavelength, the first mirror is polarisation-selective at the first wavelength, a second wavelength and a third wavelength as described. In some embodiments, each wavelength component of the light of the picture is provided by a respective light source and modulation of a respective SLM with a respective hologram, as described above.

The embodiments described with reference to FIGS. 10 to 12 may also include at least one laser-line selective filter as described with reference to earlier embodiments. A thermal load results from sunlight entering the head-up display through the output of the optical system. In some embodiments, the at least one laser-line selective filter is a coating on the first mirror such that the thermal load caused by sunlight is spread across the first and second mirror. In fact, the inventors have found that the thermal load is fairly evenly spread across the first mirror and second mirror using this approach. Accordingly, the individual thermal load placed on both mirrors by removing (such as absorbing) sunlight is substantially reduced thereby increasing the lifetime of the device or reducing the cost of the device.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. In some embodiments, the light receiving surface is a screen or a diffuser. The holographic projection system of the present disclosure may also be used to provide an improved head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e, the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

However, the resulting holographic reconstruction can still suffer from "speckle" if a coherent light source, such as a laser, is used. Speckle is well-known and is the result of interference of light scattered off an optically rough surface. It is desirable to reduce such speckle. Embodiments include elements and techniques which reduce the perceived speckle in the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle, the head-up display comprising:
    a picture generating unit arranged to generate a picture on a light receiving surface, wherein the picture generating unit comprises:
        a light source arranged to emit light;
        a spatial light modulator arranged to receive the light from the light source and output spatially-modulated light in accordance with a computer-generated hologram represented on the spatial light modulator to form the picture on the light receiving surface; and
        a holographic processor arranged to output the computer-generated hologram to the spatial light modulator,
    wherein the head-up display further comprises:
        an optical system arranged to image the picture, wherein the optical system comprises:
            an input arranged to receive light of the picture;
            an output arranged to output light forming an image of the picture;
            a first mirror and a second mirror arranged to guide light from the input to the output along an optical path, wherein the optical path comprises: a first optical path from the input to the second mirror, wherein the first mirror comprises a polarisation-selective filter configured to reflect light polarised in a first direction and transmit light polarised in a second direction; and a second optical path from the second mirror to the output including a reflection of the light polarised in the first direction off the first mirror.

2. The head-up display as claimed in claim 1 wherein the first transmission through the first mirror comprises a transmission through a first surface of the first mirror and then a transmission through a second surface of the first mirror, wherein a radius of curvature of the first surface is less than a radius of curvature of the second surface.

3. The head-up display as claimed in claim 1 wherein the picture generating unit, the first mirror and the second mirror are arranged on a common straight-line axis.

4. The head-up display as claimed in claim 1 wherein the picture generating unit, the first mirror and the second mirror are substantially coplanar.

5. The head-up display as claimed in claim 1 wherein the light of the picture received by the input of the optical system is polarised in a first direction.

6. The head-up display as claimed in claim 5 wherein the optical system comprises a quarter-waveplate disposed between the first mirror and second mirror, wherein the first optical path includes a first pass of the quarter-waveplate and the second optical path includes a second pass of the quarter-waveplate, wherein the quarter-waveplate is a coating on the second mirror.

7. The head-up display as claimed in claim 1 wherein the second direction is perpendicular to the first direction.

8. The head-up display as claimed in claim 1 wherein the optical system further comprises a third mirror on the optical path; and the first optical path further comprises a second transmission through the first mirror and a reflection off the third mirror.

9. The head-up display as claimed in claim 8 wherein: the second transmission through the first mirror occurs before the reflection off the third mirror; and the reflection off the third mirror occurs before the first transmission through the first mirror.

10. The head-up display as claimed in claim 8 wherein the third mirror is substantially collinear or coplanar with the first mirror and the second mirror.

11. The head-up display as claimed in claim 1 wherein the light of the picture received by the input of the optical system has a first wavelength and the optical system further comprises at least one laser-line selective filter on the optical path.

12. The head-up display as claimed in claim 11 wherein the at least one laser-line selective filter is a coating on the first mirror or the second mirror and the laser-line selective filter is substantially transmissive at the first wavelength and substantially non-transmissive at other optical wavelengths.

13. The head-up display as claimed in claim 12 wherein the laser-line selective filter is the reflective component of the first or the second mirror and the laser-line selective filter is substantially reflective at the first wavelength and substantially non-reflective at other optical wavelengths.

14. The head-up display as claimed in claim 11 wherein the laser-line selective filter is correspondingly selective at a second wavelength and a third wavelength, wherein the second wavelength is not equal to the first wavelength and the third wavelength is not equal to the first wavelength or second wavelength.

15. A method for providing a head-up display for a vehicle, the method comprising:
  generating a picture on a light receiving surface, the generating comprising:
    representing a computer-generated hologram on a spatial light modulator;
    receiving light from a light source on the spatial light modulator;
    outputting from the spatial light modulator spatially-modulated light in accordance with a computer-generated hologram; and
    receiving the spatially-modulated light on the light receiving surface to form the picture on the light receiving surface,
  wherein the method further comprises:
    imaging the picture using an optical system, wherein the imaging comprises:
      receiving light of the picture at an input of an optical system; and
      guiding light of the picture from the input to an output along an optical path, wherein the optical path comprises: a first optical path from the input to a second mirror including, wherein the first mirror comprises a polarisation-selective filter configured to reflect light polarised in a first direction and transmit light polarised in a second direction; and a second optical path from the second mirror to the output including a reflection of the light polarised in the first direction off the first mirror.

16. The method as claimed in claim 15, wherein the first transmission through the first mirror comprises a transmission through a first surface of the first mirror and then a transmission through a second surface of the first mirror, wherein a radius of curvature of the first surface is less than a radius of curvature of the second surface.

17. The method as claimed in claim 15, wherein the first mirror is substantially transmissive to light polarised in a first direction and substantially reflective to light polarised in a second direction, wherein the second direction is perpendicular to the first direction.

* * * * *